(12) United States Patent
Erdler et al.

(10) Patent No.: US 8,453,505 B2
(45) Date of Patent: Jun. 4, 2013

(54) ACCELERATION SENSOR AND/OR TILT SENSOR

(75) Inventors: Gilbert Erdler, Freiburg (DE); Joerg Franke, Freiburg (DE)

(73) Assignee: Micronas GmbH, Freiburg I.BR. (DE)

( * ) Notice: Subject to any disclaimer, the term of this patent is extended or adjusted under 35 U.S.C. 154(b) by 279 days.

(21) Appl. No.: 12/960,152

(22) Filed: Dec. 3, 2010

(65) Prior Publication Data

US 2012/0137777 A1   Jun. 7, 2012

(51) Int. Cl.
*G01P 15/11* (2006.01)
*G01C 9/18* (2006.01)

(52) U.S. Cl.
USPC ..................... 73/514.09; 33/366.18

(58) Field of Classification Search
USPC ............... 73/514.09, 514.08, 514.05; 33/366, 33/366.15, 366.18
See application file for complete search history.

(56) References Cited

U.S. PATENT DOCUMENTS

| 4,676,103 A * | 6/1987 | Nakajima ................. 73/514.09 |
| 5,908,987 A * | 6/1999 | Raj ............................ 73/514.09 |
| 6,583,725 B2 | 6/2003 | Fehrenkamp |

FOREIGN PATENT DOCUMENTS

| DE | 20 2006 015 855 U1 | 1/2007 |
| DE | 10 2006 007 900 B4 | 4/2008 |

* cited by examiner

*Primary Examiner* — John Chapman, Jr.
(74) *Attorney, Agent, or Firm* — Muncy, Geissler, Olds & Lowe, PLLC

(57) ABSTRACT

Acceleration and/or tilt sensor having a ferromagnetic fluid that is located in a receptacle, and the receptacle constitutes a neutral position for the fluid, and the fluid is permanently magnetized, and a magnetic field detector arrangement is located at the receptacle to detect a displacement of the fluid, wherein a portion of the fluid can be displaced relative to the receptacle from the neutral position to an operating position by an external force while maintaining a continuous surface with the portion of the fluid remaining in the neutral position, and the fluid returns to the neutral position after removal of the external force.

14 Claims, 7 Drawing Sheets

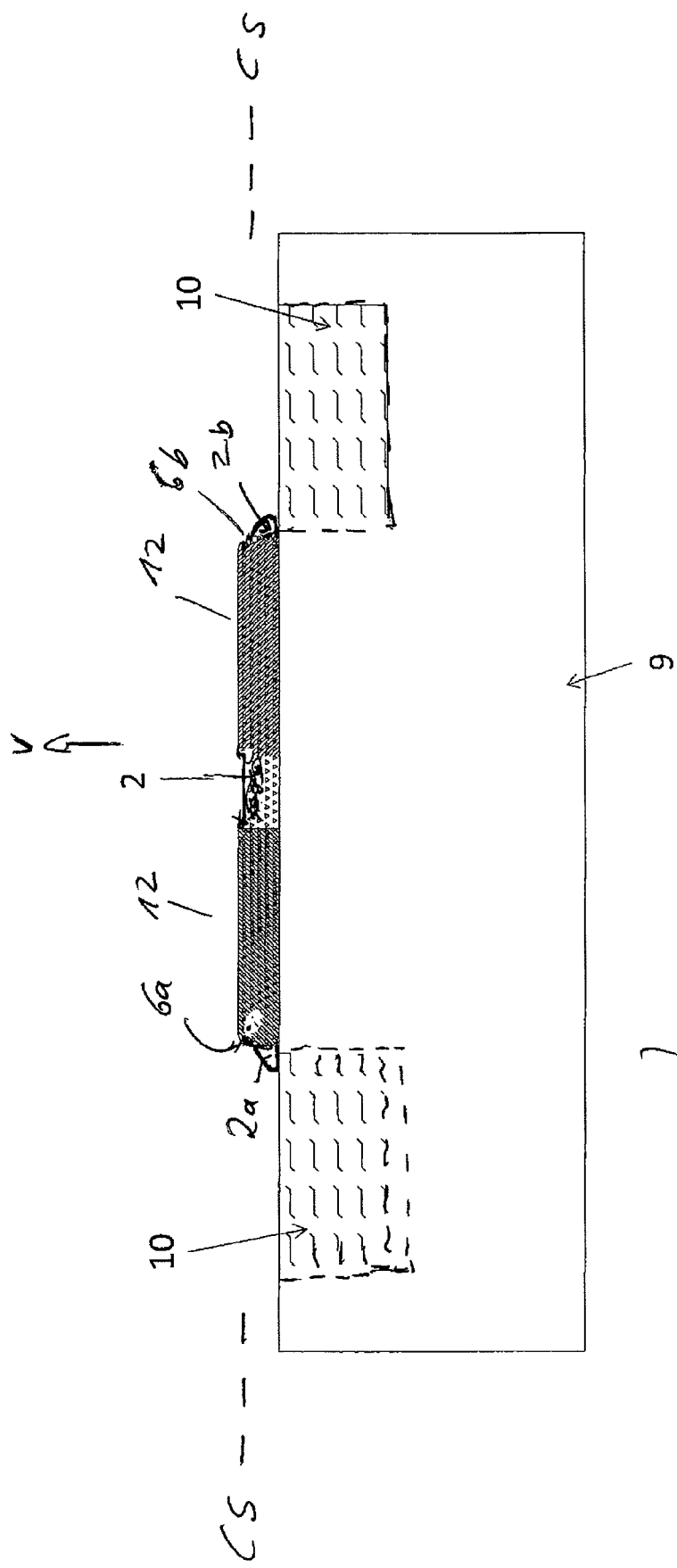

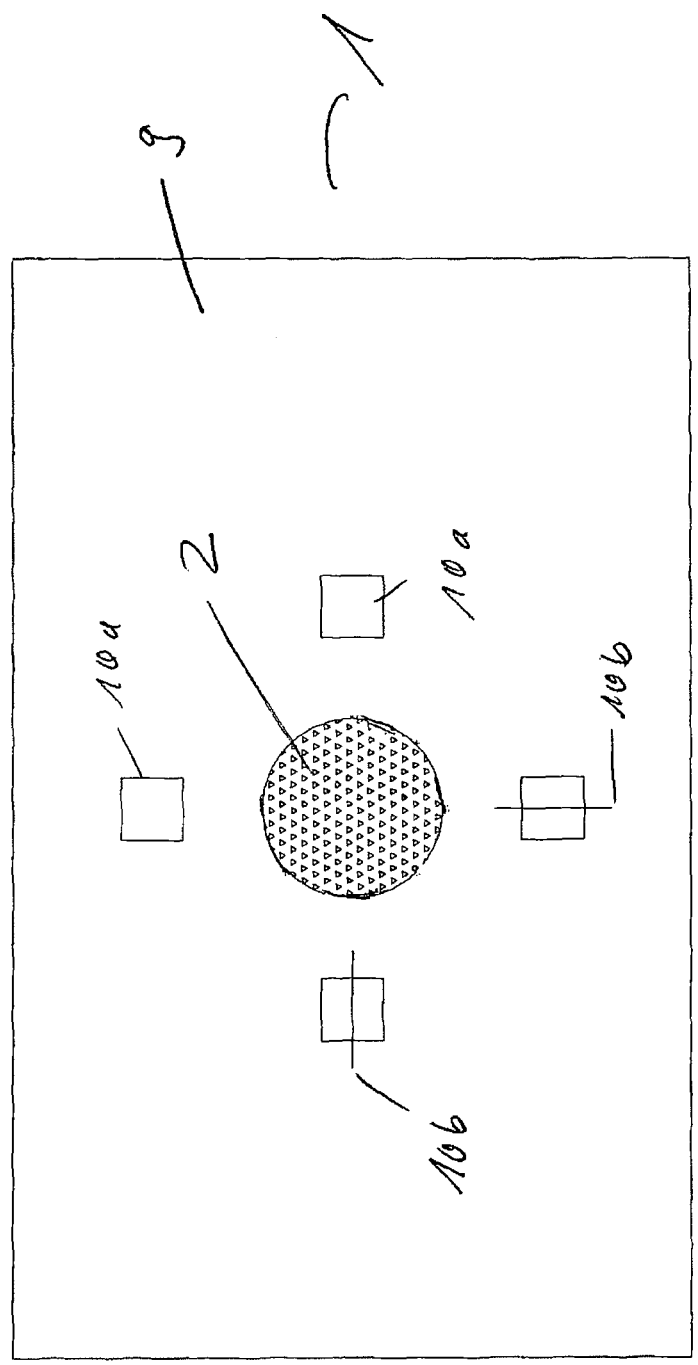

ACCELERATION SENSOR AND/OR TILT SENSOR

BACKGROUND OF THE INVENTION

1. Field of the Invention

The invention concerns an acceleration sensor and/or tilt sensor having a ferromagnetic fluid that is located in a receptacle and that can be displaced relative to the receptacle from a neutral position to an operating position by an external force, wherein the fluid is permanently magnetized and/or the acceleration sensor has a magnetic field generator to generate a magnetic field that permeates the fluid, and wherein a magnetic field detector arrangement is located at the receptacle to detect a displacement of the fluid.

2. Description of the Background Art

An acceleration and/or tilt sensor of this nature is known from DE 10 2006 007 900 B4. The acceleration and/or tilt sensor has a closed housing as receptacle, which surrounds a hollow interior that is approximately half filled with the ferromagnetic fluid. Located below the bottom of the housing is a permanent magnet whose magnetic field permeates the fluid. To detect a displacement of the fluid, the acceleration and/or tilt sensor has a magnetic field detector arrangement with two Hall sensors that are located between the housing and the permanent magnet. The acceleration and/or tilt sensor has the disadvantage that the fluid distribution in the hollow interior of the housing, and thus the magnetic field at the Hall sensors, changes only slightly when small external forces arise. Consequently, the acceleration and/or tilt sensor permits only a limited sensitivity.

Another sensor is known from U.S. Pat. No. 6,583,725 B2. Here, the acceleration or tilt is detected by means including a magnetic fluid. In this design, the fluid flows from a first housing part into a second housing part. In order to keep the fluid from running out, the housing is sealed with respect to the environment.

Against this background, the object of the invention is to specify a device that further develops the state of the art.

SUMMARY OF THE INVENTION

According to the subject matter of the invention, an acceleration and/or tilt sensor is disclosed having a ferromagnetic fluid located in a receptacle, wherein the receptacle constitutes a neutral position for the fluid, and the fluid is permanently magnetized, and a magnetic field detector arrangement is located at the receptacle to detect a displacement of the fluid, and wherein a portion of the fluid can be displaced relative to the receptacle from a neutral position to an operating position by an external force while maintaining a continuous surface with the portion of the fluid remaining in the neutral position, and the fluid returns to the neutral position after removal of the external force.

An advantage of the invention is that the fluid is only partially displaced from the neutral position or receptacle. In this context, displacement is understood to be exclusively a deformation of the surface of the fluid such that the portion of the fluid that is deflected does not run out, which is to say that a shared surface is formed with the portion of the fluid remaining in the receptacle. Investigations by the applicant have shown that with adequate surface tension and suitable adhesion of the fluid in the receptacle, the fluid takes the form of a meniscus, and formations delimiting the meniscus, in particular formations designed as housing parts, are obsolete.

In a refinement, the receptacle is designed as an open housing in such a manner that the receptacle has at least one lateral opening into which a subset of the fluid in the neutral position can be displaced by the external force. By this means, the sensor is made more robust, in particular with respect to impulsive accelerations. Preferably the housing parts can be made of a plastic. Notably, plastics that can be processed using lithographic processes in semiconductor manufacture, such as, in particular, SU8 photoresist, polyimide, and PMMA, may be used for this purpose. Preferably, the acceleration and/or tilt sensor can be designed as an integrated acceleration and/or tilt sensor. To this end, the receptacle is made on a wafer surface. A magnetic field sensor, preferably a Hall sensor, is integrated in the wafer surface, at least at one point on the receptacle where the housing has an opening. Multiple magnetic field sensors with different orientations may also be formed in this design in order to detect the different directions of application of a force. Preferably, the magnetic field sensors are formed in close proximity to the neutral position of the fluid.

It is preferable for the acceleration and/or tilt sensor, especially the parts of the acceleration and/or tilt sensor that do not include the magnetic field sensors, to be manufactured in a back-end CMOS process. Microfluidic structures of this nature can be applied by means of high-aspect ratio photoresist layers, such as SU8, polyimide, or PMMA, or by means of laminating techniques or bonding techniques. Subsequently, the channel structures are preferably lidded and filled with the ferrofluid. Alternatively, the microfluidic structures can also be applied to the underside of the substrate or can be etched into the substrate by means of bulk silicon micromechanics. The mobility of the ferrofluid on the substrate surface, in particular on the wafer surface, can be adjusted by specific surface modification in such a manner that the wetting, which is to say the contact angle of the meniscus between the substrate surface and the ferrofluid, either increases or decreases.

In particular, it is advantageous to match the dimension of the opening and the surface tension of the fluid to one another. This makes it possible to use fluids with different surface tensions. Moreover, different acceleration and/or tilt angle ranges can be measured by the sensor. It is a matter of course that the openings for a given surface tension should be made smaller for large acceleration ranges to be measured than they should for small acceleration ranges to be detected.

In another refinement, the acceleration and/or tilt sensor is designed with a ferromagnetic fluid, located in a receptacle, that can be displaced relative to the receptacle from a neutral position to an operating position by an external force, wherein the fluid is permanently magnetized, and wherein a magnetic field detector arrangement is located at the receptacle to detect a displacement of the fluid, wherein the receptacle has at least one lateral opening into which a subset of the fluid in the neutral position can be displaced by the external force, and that the dimensions of the opening and the surface tension of the fluid are matched to one another in such a manner that the fluid returns to the neutral position after removal of the external force.

A fluid of this nature is also known by the name "ferrofluid." When the fluid is accelerated, at least regions of it are displaced, causing it to change its shape. This shape change causes a change in the magnetic field in the fluid's environment, which is measured with the aid of the magnetic field detector arrangement located in the magnetic field in order to detect the displacement of the fluid, and hence the acceleration. Since the fluid can exit the receptacle at the opening upon the occurrence of an acceleration and/or tilt, a relatively great change in the fill level of the fluid takes place in the receptacle. Consequently, the acceleration sensor according to the invention permits a simple and economical design. The acceleration and/or tilt sensor according to the invention can also be used as a vibration sensor.

In a preferred embodiment of the invention, the receptacle has a wall standing in contact with the fluid in the neutral position that is wetting for the fluid, wherein a surface that is dewetting for the fluid and that stands in contact with the fluid in the operating position is located in and/or behind the opening. As a result of the differently structured surfaces, namely the wetting wall on one side and the dewetting surface on the other side, a lateral running and/or flowing away of the fluid is prevented, with the result that the fluid is held together even when an acceleration occurs. For the most part, the fluid remains in the receptacle, although an edge region thereof can overlap the dewetting surface.

It is advantageous for the receptacle to have a floor, and for the magnetic field detector arrangement to have at least one magnetic field sensor that is recessed into the floor. The floor of the receptacle can, in particular, be formed by the surface of a semiconductor chip in which the magnetic field sensor is monolithically integrated. This makes the acceleration sensor even more economical to manufacture.

In another advantageous embodiment of the invention, the magnetic field detector arrangement has at least one magnetic field sensor that is arranged in and/or behind the opening in such a manner that the portion of the fluid displaced from the receptacle when the external force arises overlaps the magnetic field sensor in the operating position. When a displacement of the fluid toward the magnetic field sensor takes place, the magnetic field strength at the magnetic field sensor increases, whereas it decreases with a displacement of the fluid away from the magnetic field sensor.

It is advantageous for multiple magnetic field sensors to be arranged next to one another in a sensor row, and for the sensor row to surround the floor. This makes it possible to ascertain the direction in which the external force acts with the aid of the measurement signals from the magnetic field sensors.

In a preferred embodiment of the invention, the receptacle has a channel filled with the fluid, wherein the opening is provided at least at one end of the channel. In the case of an acceleration sensor for measuring a linear acceleration, the channel preferably is straight. In the case of an acceleration sensor for measuring an angular acceleration, the channel preferably extends along a circular path concentric to the axis of the acceleration.

It is advantageous for the receptacle to have multiple lateral boundary projections that delimit or surround a receptacle space for the fluid, and for the openings to be located between the lateral boundary projections. In this design, the spacing between the lateral boundary projections should be chosen such that the fluid can be deflected into the intermediate spaces between the projections by the external force without running out of the receptacle space. After the removal of the external force, the fluid returns to its original position and shape.

In a preferred embodiment of the invention, the receptacle has multiple openings that are spaced apart in different directions from the center of the receptacle. The acceleration and/or tilt sensor permits even greater sensitivity as a result.

In useful fashion, several of the lateral boundary projections separated from one another by the openings are arranged next to one another in a row, wherein this row surrounds the receptacle space for the fluid in the shape of a ring or in the shape of an annular segment. The fluid can then be deflected in different directions from a neutral position. Preferably the lateral boundary projections are located along a circular ring.

In useful fashion, the receptacle region has a lid that covers the receptacle space and is attached to the floor via the lateral boundary projections. The fluid is then contained better in the receptacle space.

In a preferred embodiment of the invention, the cross-section of the lateral boundary projections tapers in a plane extending parallel to the plane of the floor, proceeding in each case towards the fluid from the end of the lateral boundary projection furthest from the fluid that is in the neutral position. As a result, only a relatively small contact area is produced between the lateral boundary projections and the fluid, so that the fluid can easily be displaced and/or change its shape when an acceleration occurs.

In useful fashion, the magnetic field detector arrangement has at least one magnetic field sensor that is designed as a Hall sensor. In this regard, it is even possible for the magnetic field detector arrangement to have multiple Hall sensors whose Hall plates are oriented in different directions and, in particular, orthogonal to one another, in order to measure different components of the magnetic field. The magnetic field detector arrangement can have at least one vertical and/or at least one horizontal magnetic field sensor.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4a shows a schematic sectional drawing along line CS of the sensor from FIG. 4, FIG. 10 shows a view of a sensor [illeg.] a receptacle without housing parts.

DETAILED DESCRIPTION

An acceleration sensor labeled overall as 1 has a ferromagnetic fluid 2, which is magnetized along a magnetization axis 3. The magnetization can be accomplished through permanently magnetized particles made of iron, nickel, or cobalt contained in the fluid that have been aligned along a magnetization axis 3 with the aid of a strong magnetic field.

The fluid 2 is arranged in a receptacle in such a way that it can be displaced relative to the receptacle by an acceleration acting on the acceleration sensor 1. In order to detect a displacement of the fluid 2, a magnetic field detector arrangement is integrated in the receptacle.

Figure 1:
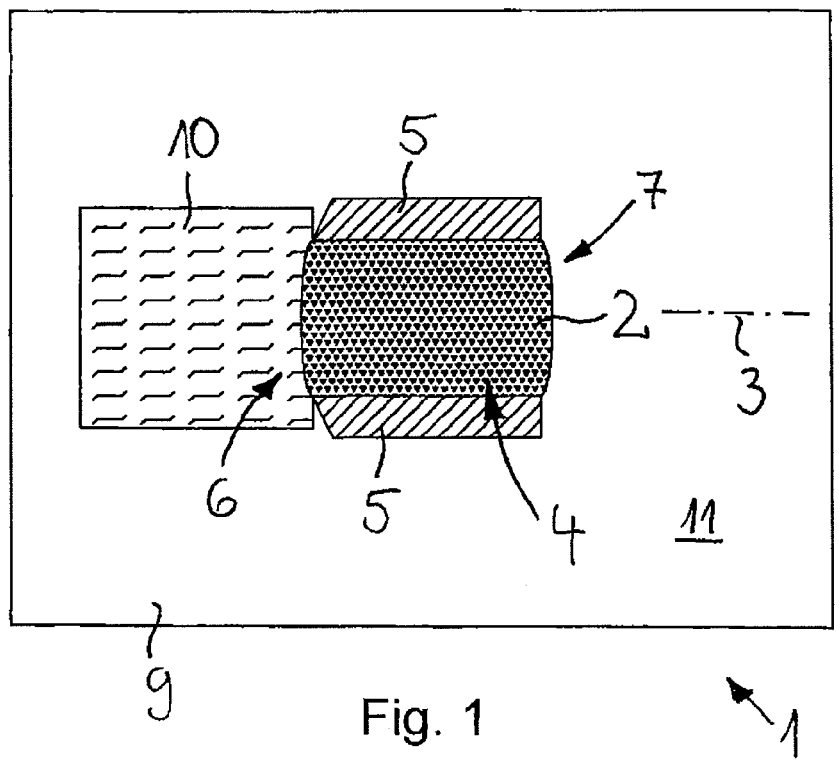
FIG. 1 shows a view of an acceleration and/or tilt sensor that has a ferrofluid which changes its position as a function of the acceleration, with the ferrofluid being in a neutral position.
Figure 2:
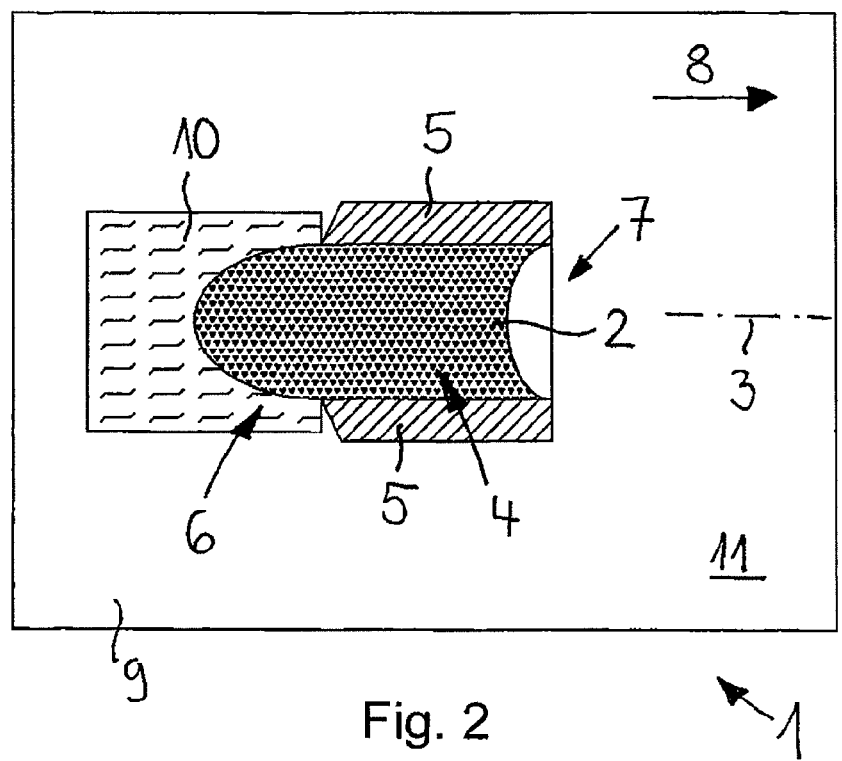
FIG. 2 shows a representation similar to FIG. 1, although the ferrofluid has been displaced from the neutral position by an acceleration force.
Figure 3:
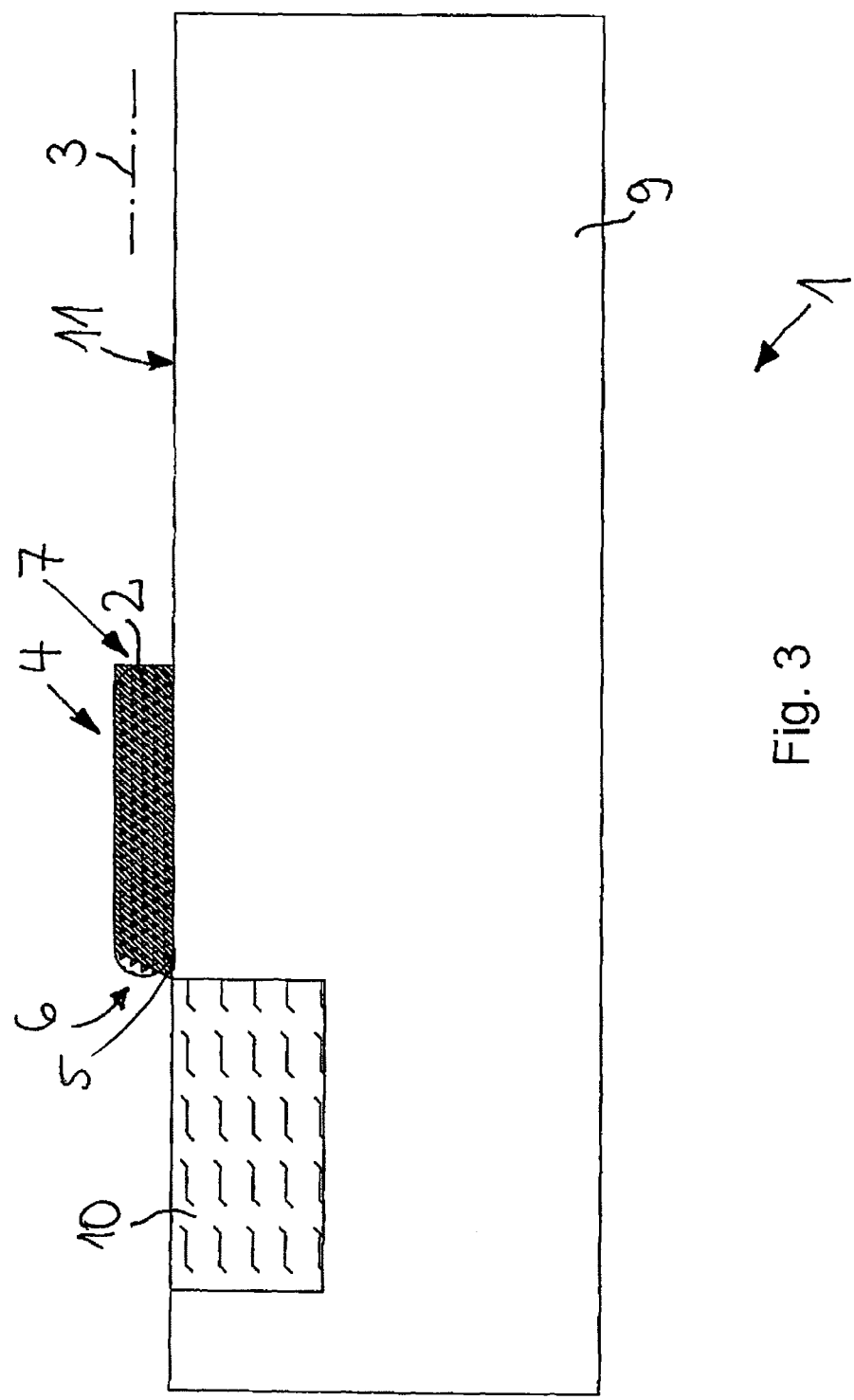
FIG. 3 shows a longitudinal section through the acceleration and/or tilt sensor shown in FIGS. 1 and 2.

In the exemplary embodiment shown in FIGS. 1 through 3, the receptacle has a channel 4 whose longitudinal axis is located in the magnetization axis or runs parallel thereto. The channel 4 is surrounded by a wall 5, which is approximately cylindrical on its inner surface facing the acceleration 2. The inner surface of the wall 5 facing the channel 4 is wetting for the fluid 2. This can be achieved by the means that the wall 5 is made of a wetting material, or is coated on its inner side with such a material. However, it is also possible for the wall 5 to have structuring on its inner surface that is wetting for the fluid 2.

At each of its ends that face away from one another, the channel 4 has an opening 6 whose dimensions correspond to the interior cross-sectional dimensions of the channel 4. The cross-sectional dimensions of the channel 4 and the surface tension of the fluid 2 are coordinated with one another such that the fluid 2 is held together in the channel 4.

It can be seen in FIG. 2 that, when an acceleration occurs parallel to the longitudinal extent of the channel 4 in the direction of the arrow 8, the fluid 2 shifts in the direction of the longitudinal extent of the channel 4 relative to the wall 5. During the process, a portion of the fluid 2 exits the channel 4 at a first opening 6, in opposition to a restoring force caused by the surface tension of the fluid 2. Because of the surface tension, the surface of the part of the fluid 2 extending out of the first opening 6 has a convex curvature.

At the second opening 7 that is opposite, the fluid 2 moves away from the second opening 7 and towards the first opening 6 when the acceleration occurs. As a result, a region that is no longer filled with the fluid 2 arises in the channel 4 at the second opening 7. The surface region of the fluid 2 facing the opening 7 has a concave curvature because of the surface tension.

It should be mentioned as well that the magnetization axis 3 in the exemplary embodiment shown in FIG. 1-3 can also be placed perpendicular to the plane of the semiconductor chip 9.

The channel 4 is located on a semiconductor chip 9, and the direction of its longitudinal extent is approximately parallel to the plane in which the semiconductor chip 9 extends. Monolithically integrated in the semiconductor chip 9 is a magnetic field sensor 10, preferably a Hall sensor. As is evident in FIGS. 2 and 3, the magnetic field sensor 10 is arranged laterally to a straight extension of the channel 4 in such a way that the portion of the fluid 2 displaced from the channel 4 in the event of an acceleration partially overlaps the magnetic field sensor 10. When an acceleration acting in the direction of the axis of magnetization occurs, this causes the magnetic field permeating the magnetic field sensor 10 to change, which results in a change in the measurement signal of the magnetic field sensor 10. An acceleration is also understood to include gravitational acceleration.

In order to avoid wetting the surface 11 of the semiconductor chip 9 with the fluid 2, the surface 11 is dewetting for the fluid 2, at least in regions adjacent to the openings 6, 7. This can be achieved by the means that a layer or coating made of a dewetting material is applied to the semiconductor chip 9. However, it is also possible for the surface 11 to have structuring that is dewetting for the fluid 2. The dewetting surface 11 thus serves as a boundary surface that plays a role in ensuring that the fluid 2 cannot flow away laterally.

The measurement signal of the magnetic field sensor 10 is evaluated by means of an analysis unit, which is not shown, and is converted into an output signal that is proportional to the component of the acceleration oriented in the longitudinal direction of the channel 4. The output signal may be an analog signal or a digital signal. The conversion of the measurement signal into the output signal may be undertaken on the basis of parameters which may be stored, for example in the form of a characteristic curve or in the form of sampling points in the magnetic field detector arrangement. The analysis unit is preferably designed as electric circuitry integrated in the semiconductor chip 9.

Figure 4:
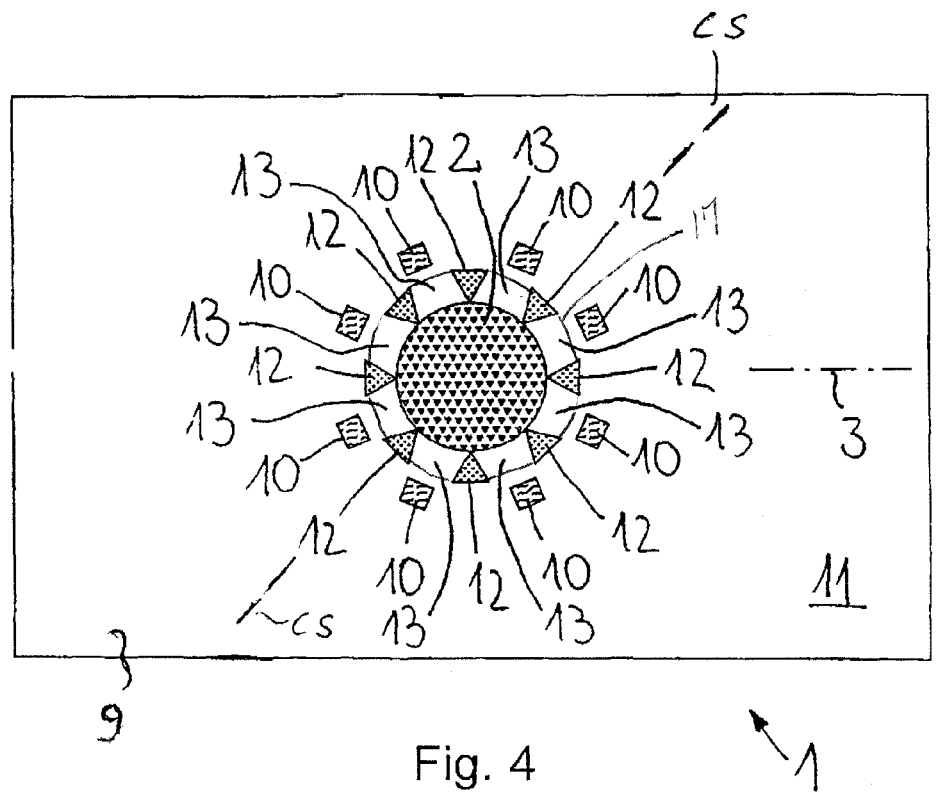
FIG. 4 shows a view of an acceleration and/or tilt sensor in which multiple lateral boundary projections and magnetic field sensors are located around the ferrofluid that is in the neutral position.
Figure 5:
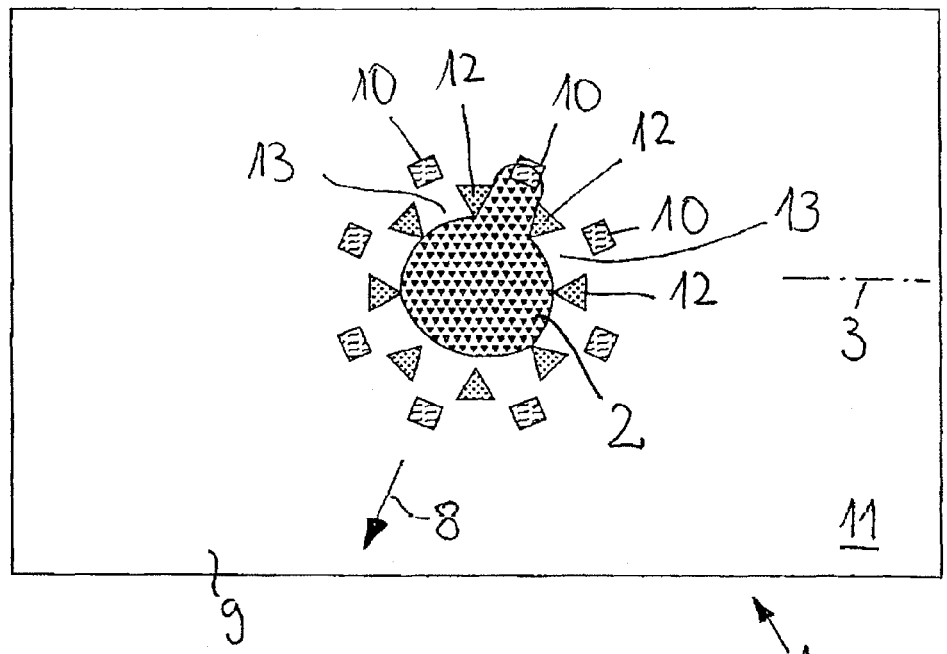
FIG. 5 shows a representation similar to FIG. 4, although the ferrofluid has been displaced from the neutral position by an acceleration force.

In the exemplary embodiment shown in FIGS. 4 and 5, a receptacle space for the fluid 2 is provided on the semiconductor chip 9. This space is delimited at the bottom by a floor, which is composed of a region of the surface 11 of the semiconductor chip 9. The floor is wetting for the fluid 2. For this purpose, the floor is structured appropriately and/or the semiconductor chip has a wetting coating in the region of the floor.

The receptacle space is delimited laterally by multiple lateral boundary projections 12, protruding transversely to the plane of the floor, which abut the fluid 2. The lateral boundary projections 12 are arranged next to one another in a row which encloses the receptacle space for the fluid 2 in the shape of a ring. Formed between the lateral boundary projections 12 are openings 13, into which the fluid 2 can be deflected by an external force.

In a plane that is parallel to the surface 11 of the semiconductor chip 9, the lateral boundary projections 12 have an approximately triangular cross-section. It is clearly visible that the cross-section of the lateral boundary projections 12 tapers from the end furthest from the fluid 2 that is in the neutral position (FIG. 4) towards the end of the lateral boundary projections 12 facing the fluid 2 in each case. Consequently, when the fluid 2 is in the neutral position, only a very small part of the surface of the lateral boundary projections 12 comes in contact with the fluid 2. The surface of the lateral boundary projections 12 is dewetting for the fluid 2. FIG. 4 also illustrates a lid 17 that covers the receptacle region and is attached to the floor via the lateral boundary projections 12.

The clearance between the lateral boundary projections 12, the wetting characteristics of the floor surface, the dewetting characteristics of the surface of the lateral boundary projections 12, and the surface tension of the fluid 2 are matched to one another in such a manner that the application of an acceleration acting parallel to the plane of the floor can cause a portion of the fluid 2 to be displaced (FIG. 5) from the neutral position shown in FIG. 4, in opposition to the surface tension of the fluid 2, through the openings 13 formed between the lateral boundary projections 12 to behind the lateral boundary projections 12.

The diameter inside the openings 13 decreases in planes extending parallel to the surface of the semiconductor chip 9, in each case proceeding from the end of the intermediate spaces 13 facing the fluid 2 in the neutral position to the other, opposite end of the openings 13. The surface 11 of the semiconductor chip 9 is dewetting at the locations on the surface 11 of the semiconductor chip 9 where the fluid 2 is not located when in the neutral position and, when an acceleration occurs, are overlapped by the fluid 2.

Associated with each opening 13 is a magnetic field sensor 10, which is located outside of the opening 13 and adjacent to the end of the opening 13 that is spaced apart from the fluid 2 that is in the neutral position. It can be seen in FIG. 5 that the portion of the fluid 2 that is displaced through the opening 13 when the acceleration occurs partially overlaps the magnetic field sensor 10.

In the exemplary embodiment shown in FIGS. 4 and 5, the magnetic field sensors 10 are arranged at uniform distances from one another in a row, which is arranged concentrically to the row of lateral boundary projections 12 and to the fluid 2 that is in the neutral position. Each of the individual magnetic field sensors 10 is connected to the analysis unit, and the analysis unit is designed such that it determines the magnitude and direction of the component of the acceleration located in the surface 11 of the semiconductor chip 9.

Figure 6:
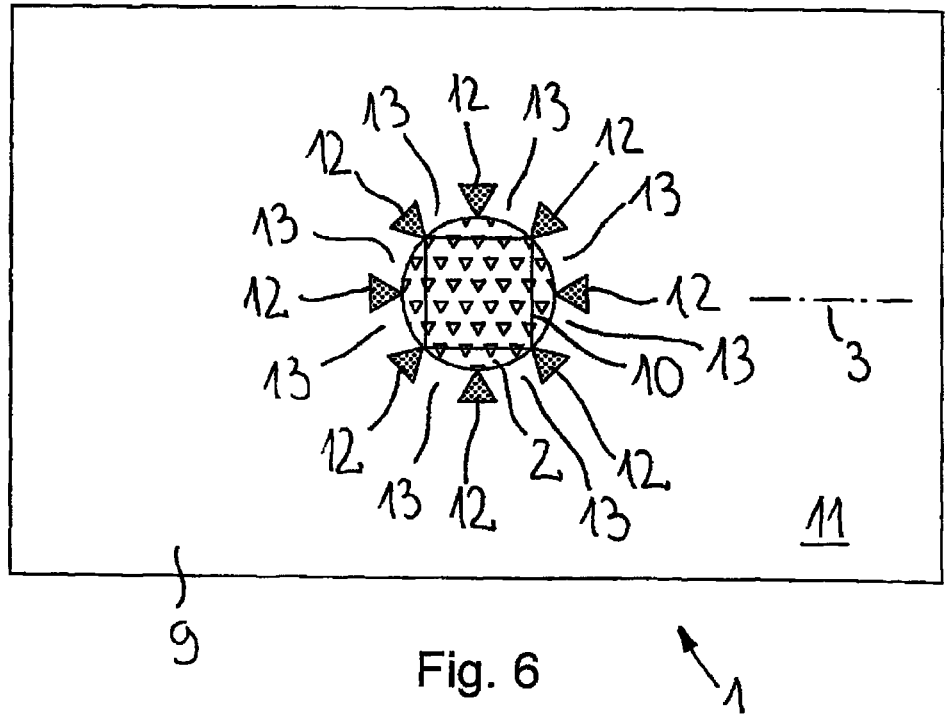
FIG. 6 shows a view of an acceleration and/or tilt sensor that has a magnetic field sensor below the ferrofluid, with the ferrofluid being in the neutral position.
Figure 7:
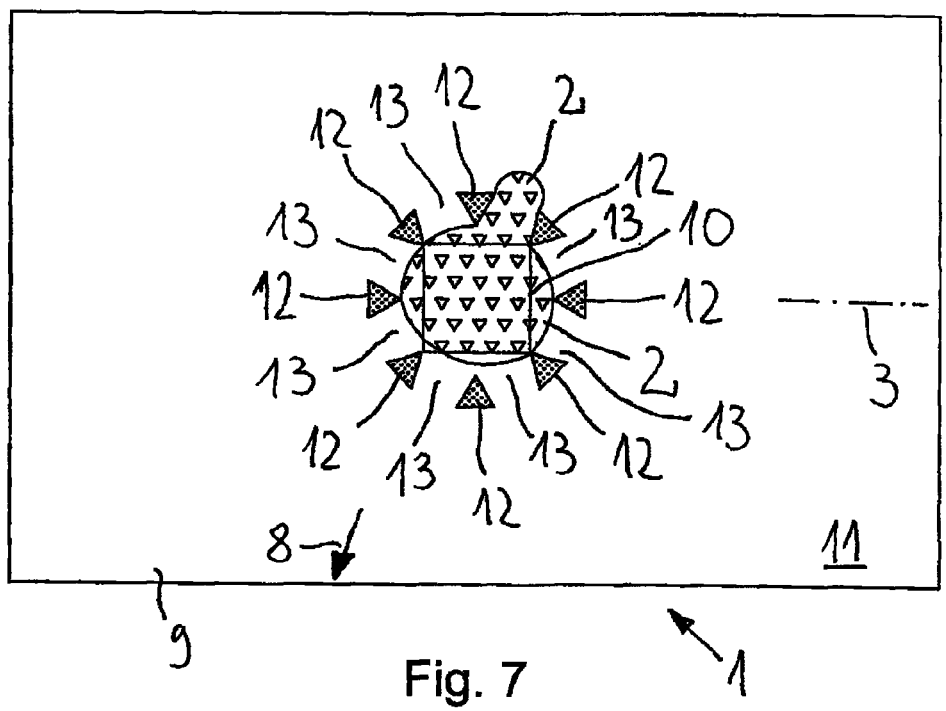
FIG. 7 shows a representation similar to FIG. 6, although the ferrofluid has been displaced from the neutral position by a lateral acceleration force.

In the exemplary embodiment shown in FIGS. 6 and 7, the floor of the receptacle and the lateral boundary projections 12 correspond to those in FIGS. 4 and 5. Instead of the row provided in FIGS. 4 and 5 with multiple magnetic field sensors 10, however, the acceleration sensor 1 depicted in FIGS. 6 and 7 has only a single magnetic field sensor 10, which is integrated in the floor and is positioned centrally with respect to the ring-shaped row of lateral boundary projections 12. The magnetic field sensor 10 is thus located beneath the fluid 2. It is clearly visible in the view of the surface 11 of the semiconductor chip that the lateral boundary projections 12 surround the magnetic field sensor 10.

It can be seen in FIG. 7 that a portion of the fluid 2 is displaced into one of the openings 13 between the lateral boundary projections 12 when an acceleration occurs. After the acceleration is removed, the fluid 2 returns to its neutral position because of the surface tension. With the acceleration sensor shown in FIGS. 6 and 7, only the strength of the acceleration can be measured in terms of magnitude.

Figure 8:
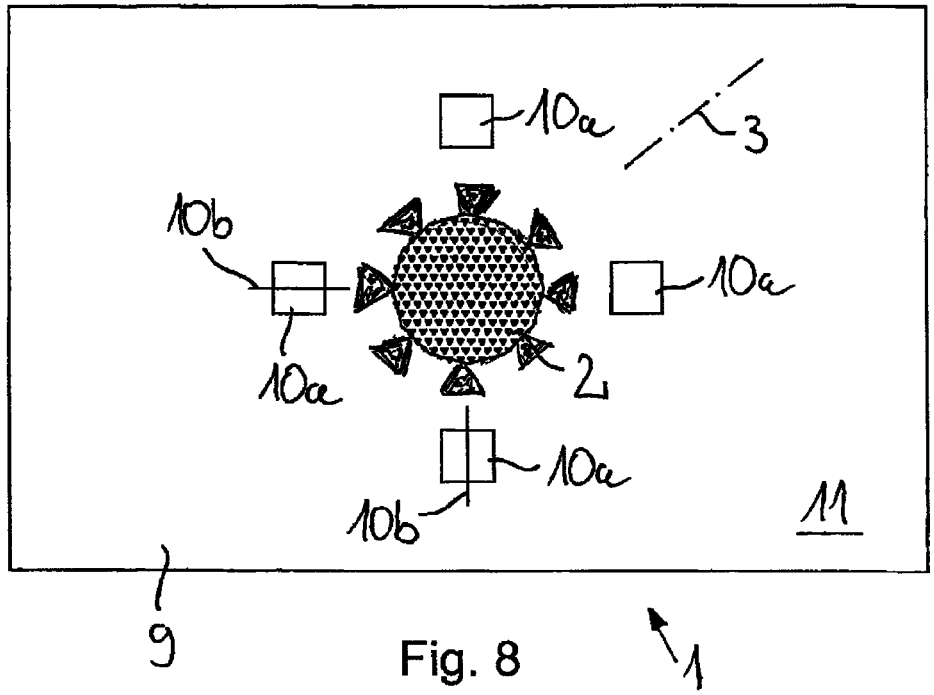
FIG. 8 shows a view of an acceleration and/or tilt sensor in which four horizontal and two vertical Hall sensors are located around the ferrofluid that is in the neutral position.

In the exemplary embodiment shown in FIG. 8, the fluid 2 is located on a floor that is composed of a subregion of the surface 11 of a semiconductor chip 9. The receptacle for the fluid 2 is laterally open here, or is encircled by an opening that is continuous in the circumferential direction without interruption. The floor located beneath the fluid in the neutral position is wetting for the fluid 2. Located around this floor is a surface 11 that is dewetting for the fluid 2, which prevents the fluid 2 from running out laterally.

Spaced at a distance of 90° around the floor or around the fluid 2 in the neutral position are four first magnetic field sensors 10a, which are designed as horizontal Hall sensors whose Hall plates are parallel to the plane in which the semiconductor chip 9 extends. In addition, two second magnetic field sensors 10b are integrated in the semiconductor chip 9; they are designed as vertical Hall sensors and their Hall plates are perpendicular to the plane in which the semiconductor chip 9 extends. As can be seen in FIG. 8, the Hall plates of the second magnetic field sensors 10b are each centered with respect to the Hall plate of a first magnetic field sensor 10a in the top view of the semiconductor chip 9. In this design, the planes of the Hall plates of the second magnetic field sensors 10a extend radially to the center of the fluid 2 in the neutral position.

The Hall plates can pass through one another or can be arranged one above the other in a direction perpendicular to the plane in which the semiconductor chip 9 extends. The two Hall plates of the second magnetic field sensors 10b are offset by 90° from one another with respect to the center of the fluid 2 located in the neutral position.

Figure 9:
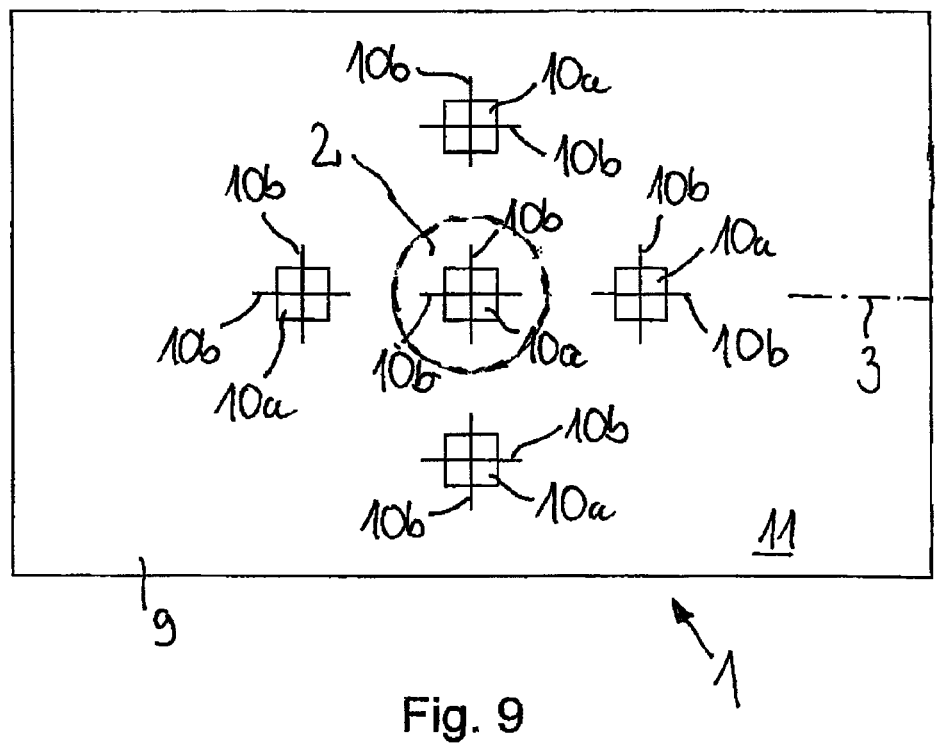
FIG. 9 shows a view of an acceleration and/or tilt sensor that has five horizontal and ten vertical Hall sensors.

In the exemplary embodiment from FIG. 9, the acceleration sensor 1 has five first magnetic field sensors 10a, of which four are arranged with a spacing of 90° around the fluid 2 in the neutral position, and an additional first magnetic field sensor 10b is positioned in the center beneath the fluid 2. The first magnetic field sensors 10a are each designed as horizontal Hall sensors that are integrated in the semiconductor chip 9.

In addition to the first magnetic field sensors 10a, the acceleration sensor 1 has ten second magnetic field sensors 10b, which are implemented as vertical Hall sensors. In the top view of the plane in which the semiconductor chip 9 extends, the Hall plates from two second magnetic field sensors 10b intersect in each case. In the top view of the plane in which the semiconductor chip 9 extends, each intersection point is located in the center of a Hall plate of a first magnetic field sensor 10b. Consequently, the magnetic field can be measured in three directions that are orthogonal to one another at all five measurement points, each of which is composed of one horizontal and two vertical Hall plates. Four of the arrangements composed of one first magnetic field sensor 10a and two second magnetic field sensors 10b are offset from one another by 90° about the center of the support surface for the fluid 2, and one additional arrangement is located in the center beneath the support surface.

The exemplary embodiment shown in FIG. 4a is a schematic cross-sectional view along a line CS of the acceleration and/or tilt sensor from FIG. 4. Shown in cross-section on the surface of the semiconductor chip 9 are the formations that are shown with a triangular shape in the top view in FIG. 4; these formations are also referred to as lateral boundary projections 12. According to the depiction in FIG. 4, two neighboring lateral boundary projections 12 always form a channel 4. In the embodiment from FIG. 4a, a fluid meniscus 2a or 2b is emerging from the channels at both diametrically opposed openings 6a, 6b. The level of the fluid 2 in the central region is lowered as a result. Accordingly, the sensor experiences an acceleration towards the direction v. The magnetic field sensors 10, which are not in the plane of the drawing and are indicated by dashed lines, detect the change in the field lines. The signal arising at the magnetic field sensors 10 serves as a measure for the magnitude of the acceleration force that is present, or in other words, the greater the acceleration force that is acting, the greater the overlap of the meniscuses with the underlying magnetic field sensors 10.

In the exemplary embodiment shown in FIG. 10, the figure shows a top view of an acceleration and/or tilt sensor 1 which has a receptacle that is formed only centrally underneath the fluid 2. In contrast to the other exemplary embodiments, the acceleration and/or tilt sensor 1 does not have any lateral boundary projections 12 at all, which in particular form channels. The fluid is held, in particular, by the wetting with the receptacle and the surface tension in the receptacle, which also defines the neutral position. In the event of an acceleration, a portion of the fluid 2 advances into regions outside the receptacle, which in particular are designed to be dewetting. If the external force that is acting becomes too small, the fluid retreats to the region of the receptacle because of the surface tension.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. Acceleration and/or tilt sensor comprising:
   a ferromagnetic fluid that is located in a receptacle and the receptacle constitutes a neutral position for the fluid, and the fluid is permanently magnetized; and
   a magnetic field detector arrangement located at the receptacle to detect a displacement of the fluid, wherein a portion of the fluid is configured to be displaced relative to the receptacle from the neutral position to an operating position by an external force while maintaining a continuous surface with the portion of the fluid remaining in the neutral position, and the fluid returns to the neutral position after removal of the external force, and wherein the receptacle has at least one lateral opening into which a subset of the fluid in the neutral position can be displaced by the external force.

2. Acceleration and/or tilt sensor according to claim 1, wherein a dimension of the opening and a surface tension of the fluid are matched to one another.

3. Acceleration and/or tilt sensor according to claim 1, wherein the receptacle has a wall standing in contact with the fluid in the neutral position that is wetting for the fluid, and wherein a surface that is dewetting for the fluid and that stands in contact with the fluid in the operating position is located in and/or behind the opening.

4. Acceleration and/or tilt sensor according to claim 1, wherein the receptacle has a floor, and wherein the magnetic field detector arrangement has at least one magnetic field sensor that is recessed into the floor.

5. Acceleration and/or tilt sensor according to claim 1, wherein the magnetic field detector arrangement has at least one magnetic field sensor that is arranged in and/or behind the opening in such a manner that the portion of the fluid displaced from the receptacle when the external force arises overlaps the magnetic field sensor in the operating position.

6. Acceleration and/or tilt sensor according to claim 1, wherein multiple magnetic field sensors are arranged next to one another in a sensor row, and wherein the sensor row surrounds a floor.

7. Acceleration and/or tilt sensor according to claim 1, wherein the receptacle has a channel filled with the fluid, and wherein the opening is provided at least at one of the ends of the channel.

8. Acceleration and/or tilt sensor according to claim 1, wherein the receptacle has multiple lateral boundary projections that delimit or surround a receptacle space for the fluid, and wherein openings are located between the lateral boundary projections.

9. An acceleration and/or tilt sensor comprising:
a ferromagnetic fluid that is arranged in a receptacle and the receptacle constitutes a neutral position for the fluid, and the fluid is permanently magnetized; and a magnetic field detector arrangement is located at the receptacle to detect a displacement of the fluid, wherein a portion of the fluid is configured to be displaced relative to the receptacle from the neutral position to an operating position by an external force while maintaining a continuous surface with the portion of the fluid remaining in the neutral position, and the fluid returns to the neutral position after removal of the external force, and wherein the receptacle has multiple openings that are spaced apart in different directions from the center of the receptacle.

10. Acceleration and/or tilt sensor according to claim 1, wherein a multiplicity of lateral boundary projections separated from one another by openings are arranged next to one another in a row, and wherein this row surrounds the receptacle space for the fluid in the shape of a ring or in the shape of an annular segment.

11. Acceleration and/or tilt sensor according to claim 1, wherein the receptacle has a lid that covers the receptacle space and is attached to the floor via lateral boundary projections.

12. Acceleration and/or tilt sensor according to claim 1, wherein a cross-section of lateral boundary projections tapers in a plane extending parallel to the floor, proceeding in each case towards the fluid from the furthest end of the lateral boundary projection from the fluid that is in the neutral position.

13. Acceleration and/or tilt sensor according to claim 1, wherein the magnetic field detector arrangement has at least one magnetic field sensor that is designed as a Hall sensor.

14. Acceleration and/or tilt sensor having a ferromagnetic fluid that is located in a receptacle and that can be displaced relative to the receptacle from a neutral position to an operating position by an external force, wherein the fluid is permanently magnetized, and wherein a magnetic field detector arrangement is located at the receptacle to detect a displacement of the fluid, wherein the receptacle has at least one lateral opening into which a subset of the fluid in the neutral position can be displaced by the external force, and in that the dimensions of the opening and the surface tension of the fluid are matched to one another in such a manner that the fluid returns to the neutral position after removal of the external force.

* * * * *